(12) United States Patent
Kuroda (10) Patent No.: US 8,905,417 B2
(45) Date of Patent: Dec. 9, 2014

(54) STABILIZER LINK AND PRODUCTION METHOD THEREFOR

(75) Inventor: Shigeru Kuroda, Yokohama (JP)

(73) Assignee: NHK Spring Co., Ltd., Yokohama-Shi (JP)

(*) Notice: Subject to any disclaimer, the term of this patent is extended or adjusted under 35 U.S.C. 154(b) by 0 days.

(21) Appl. No.: 14/127,768

(22) PCT Filed: Apr. 18, 2012

(86) PCT No.: PCT/JP2012/060403
§ 371 (c)(1),
(2), (4) Date: Dec. 19, 2013

(87) PCT Pub. No.: WO2012/176541
PCT Pub. Date: Dec. 27, 2012

(65) Prior Publication Data
US 2014/0131970 A1    May 15, 2014

(30) Foreign Application Priority Data

Jun. 20, 2011 (JP) ................................. 2011-136428

(51) Int. Cl.
*F16C 11/06* (2006.01)
*B60G 21/055* (2006.01)

(52) U.S. Cl.
CPC ........ *B60G 21/0551* (2013.01); *F16C 11/0657* (2013.01); *F16C 11/0671* (2013.01); *F16C 11/0623* (2013.01); *F16C 11/0685* (2013.01)
USPC .............. 280/124.152; 403/122; 280/124.107

(58) Field of Classification Search
CPC ............ B60G 21/0551; F16C 11/0623; F16C 11/0642; F16C 11/0671; F16C 11/0685; F16C 11/069

USPC ................... 280/124.107, 124.149, 124.152; 403/122; 29/527.1
See application file for complete search history.

(56) References Cited

U.S. PATENT DOCUMENTS

| 3,248,955 A | 5/1966 | Templeton |
| 3,269,758 A * | 8/1966 | Ulderup et al. ................. 403/36 |

(Continued)

FOREIGN PATENT DOCUMENTS

| JP | A-6-117429 | 4/1994 |
| JP | A-7-54835 | 2/1995 |

(Continued)

OTHER PUBLICATIONS

International Search Report issued in International Patent Application No. PCT/JP2012/060403 mailed Jul. 17, 2012.

*Primary Examiner* — Paul N Dickson
*Assistant Examiner* — Timothy Wilhelm
(74) *Attorney, Agent, or Firm* — Oliff PLC (57) ABSTRACT

A stabilizer link and a production method therefor are provided in which a jig for attaching a forming die to a subassembly has a simple structure and which can effectively prevent leakage of a resin to the outside. In insert molding, a ring member is used. An outer peripheral side surface of a ball seat of a subassembly is abutted to an inner peripheral surface of a hole of the ring member. An outer peripheral side radial direction surface of a fixing portion of a dust cover is pressed toward the flange portion of the ball seat by a surface of the ring member, and the fixing portion is held by the surface and the flange portion. An end portion of a die body is abutted to another surface of the ring member.

15 Claims, 8 Drawing Sheets

(56) References Cited

U.S. PATENT DOCUMENTS

| | | | |
|---|---|---|---|
| 5,697,142 A * | 12/1997 | Sugiura | 29/527.4 |
| 5,860,757 A * | 1/1999 | Sugiura | 403/131 |
| 6,139,788 A | 10/2000 | Dorr | |
| 2004/0037621 A1* | 2/2004 | Suzuki et al. | 403/135 |
| 2004/0105721 A1* | 6/2004 | Bernhardt et al. | 403/134 |
| 2006/0193680 A1* | 8/2006 | Suzuki | 403/122 |
| 2008/0038051 A1* | 2/2008 | Broker et al. | 403/134 |
| 2011/0033226 A1 | 2/2011 | Kuroda | |
| 2011/0072667 A1 | 3/2011 | Michioka et al. | |
| 2012/0155952 A1* | 6/2012 | Orend | 403/144 |

FOREIGN PATENT DOCUMENTS

| | | |
|---|---|---|
| JP | A-2004-316771 | 11/2004 |
| JP | A-2005-265134 | 9/2005 |
| JP | A-2009-257507 | 11/2009 |

\* cited by examiner

STABILIZER LINK AND PRODUCTION METHOD THEREFOR

TECHNICAL FIELD

The present invention relates to a stabilizer equipped with a housing and a support bar. In particular, the present invention relates to an improvement in a production method for a housing and a support bar that are made of resin and are integrally formed.

BACKGROUND ART

Figure 1:
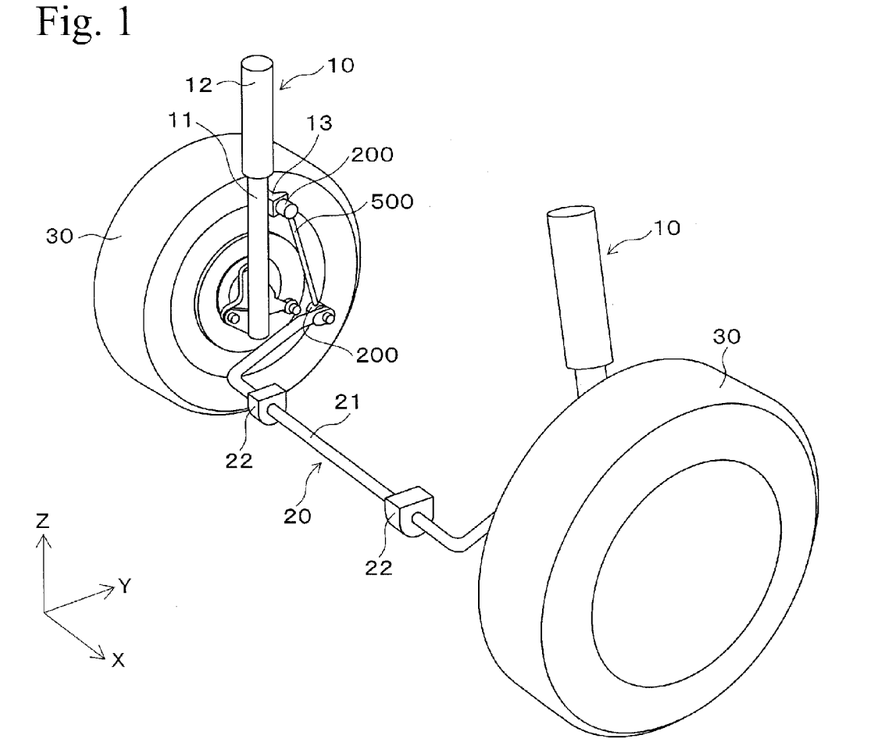
FIG. 1 is a perspective view showing a schematic structure of a front side wheel of vehicle.

A stabilizer is a ball joint part connecting a suspension apparatus and a stabilizer apparatus. FIG. 1 is a perspective view showing a schematic structure of a front side wheel of a vehicle. Each suspension apparatus 10 is provided at left and right tires 30 and has an arm 11 and a cylinder 12. A lower end portion of the arm 11 is fixed at a bearing supporting a shaft of the tire 30. The cylinder 12 is elastically movable relatively to the arm 11. A bracket 13, to which a stabilizer link 200 is mounted, is provided at the arm 11. The suspension apparatus 10 supports the weight of a vehicle body that is applied to the tire 30. A stabilizer apparatus 20 is equipped with a bar 21 that is approximately U-shaped, and the stabilizer apparatus 20 is mounted to the vehicle body via bushes 22. The stabilizer apparatus 20 secures roll stiffness of the vehicle.

The stabilizer links 200 are provided at the bracket 13 of the suspension apparatus 10 and at the end portion of the bar 21 of the stabilizer apparatus 20. The stabilizer links 200 are connected to each other by a support bar 500. The stabilizer link 200 transmits a load, which is generated when the suspension apparatus 10 receives an input from a road surface, to the stabilizer apparatus 20.

Figure 2:
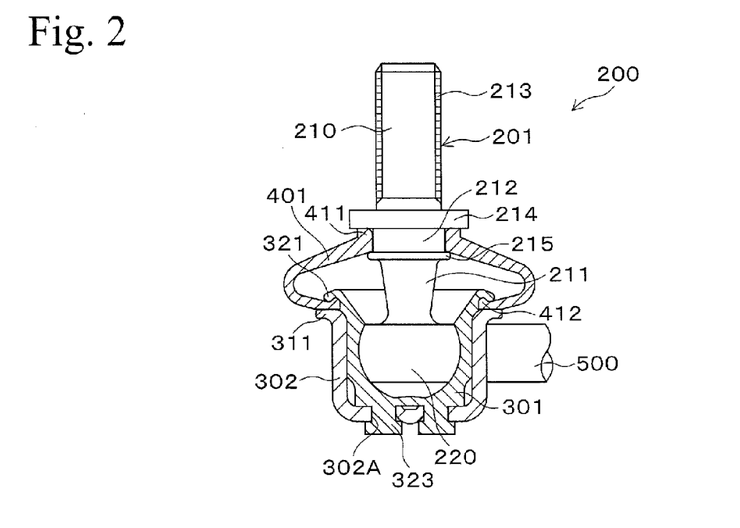
FIG. 2 is a side cross sectional diagram showing a portion of a conventional stabilizer link.

FIG. 2 is a side sectional diagram showing a portion of a structure of a specific example of the stabilizer link 200. The stabilizer link 200 is equipped with a stud ball 201, a ball seat 301, a housing 302, and a dust cover 401. The stud ball 201 has a stud portion 210 and a ball portion 220 which are integrally formed.

The stud portion 210 has a tapered portion 211, a straight portion 212, and a screw portion 213. The tapered portion 211 is formed at an upper end portion of the ball portion 220. A collar portion 214 and a projection portion 215 are formed at an upper end portion and a lower end portion of the straight portion 212. A lip portion 411 of upper end portion of the dust cover 401 abuts between the collar portion 214 and the projection portion 215 at the straight portion 212 so as to be fixed therebetween. The screw portion 213 of the stabilizer link 200 proximate to the suspension apparatus 10 is fixed at the bracket 13 of the arm 11 by screw fastening, and the screw portion 213 of the stabilizer link 200 proximate to the stabilizer apparatus 20 is fixed at the bar 21 by screw fastening.

The ball seat 301 and the housing 302 form a pivot support member that universally supports the stud ball 201. The ball portion 220 of the stud ball 201 is press-fitted into the ball seat 301. Thermal caulking portions 323 are formed at a bottom portion of the ball seat 301. The housing 302 holds the ball seat 301 therein. Each thermal caulking portion 323 projects through a hole 302A of bottom portion of the housing 302, and the leading end portion of the thermal caulking portion 323 engages with a lower surface portion of the housing 302, so that the ball seat 301 is fixed at the housing 302. A fixing portion 412 of a lower end portion of the dust cover 400 is held between flange portions 321 and 311 of the ball seat 301 and the housing 302 (for example, Patent Documents 1 and 2).

Figure 3A:
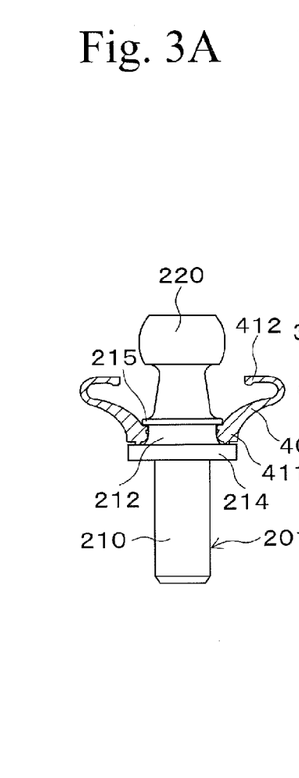
FIGS. 3A to 3E are side cross sectional diagrams of a portion of a structure showing each process of a production method for conventional stabilizer links.
Figure 3B:
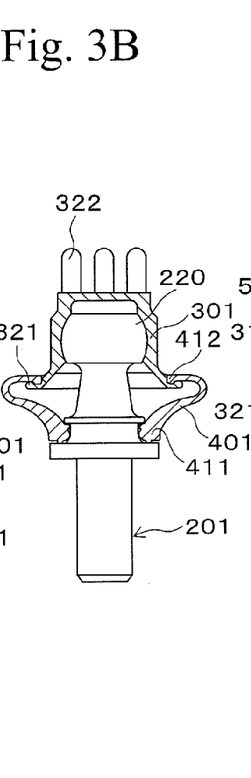
Figures 3C, 3D, 3E:
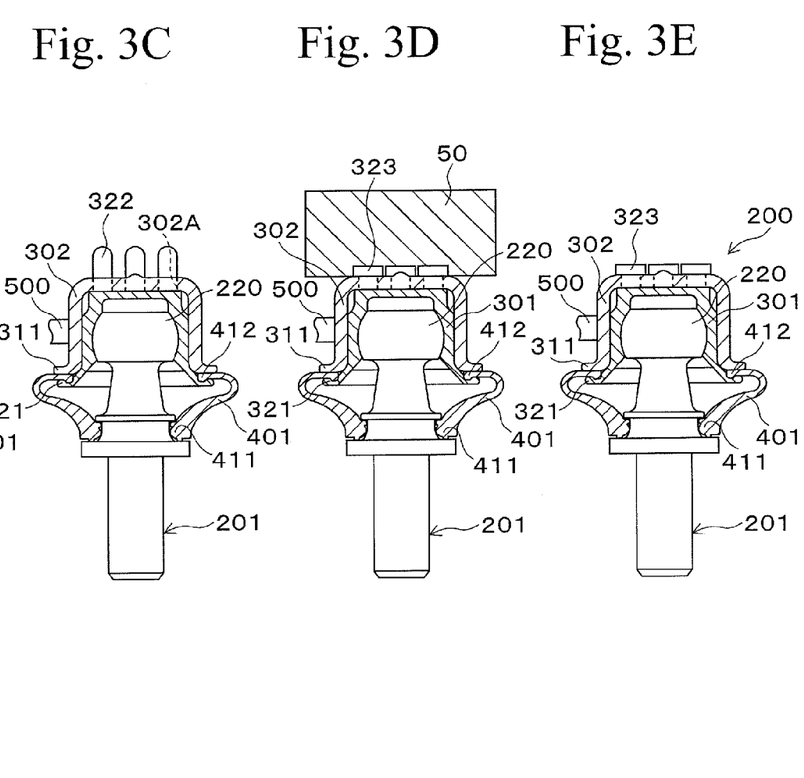

Production for stabilizer link 200 is performed by the processes shown in FIG. 3. FIGS. 3A to 3E are side cross sectional views of portions of structures showing each process of a production method for the stabilizer link 200. In FIGS. 3A to 3E, the screw portion 213 is not shown. First, as shown in FIG. 3A, the lip portion 411 of the dust cover 401 is inserted and held between the collar portion 214 and the projection portion 215 so as to closely contact the straight portion 212 of the stud ball 201. Next, as shown in FIG. 3B, the ball portion 220 of the stud ball 201 is pressed into the ball seat 301. In this case, the fixing portion 412 of the dust cover 401 is disposed at the outer peripheral surface side (upper surface side in FIG. 3) of the flange portion 321 of the ball seat 301. Reference numeral 322 is a pin portion formed at a surface (surface which is opposite to a surface into which the ball portion 220 is pressed) of the ball seat 301.

Next, as shown in FIG. 3C, the housing 302 and the support bar 500, which are integrally formed, is mounted to the ball seat 301. In this case, the fixing portion 412 of the dust cover 401 is held between the flange portions 321 and 311 of the ball seat 301 and the housing 302, and the pin portions 322 project from the holes 302A of the housing 302 to the outside. Next, as shown in FIG. 3D, the pin portions 322 of the ball seat 301 are deformed by heating using a thermal caulking machine 350, so that the thermal caulking portions 323 are formed. Thus, the ball seat 301 is fixed at the housing 302, so that the stabilizer link 200 is obtained as shown in FIG. 3E.

In stabilizer links, in the conventional techniques, iron was used as a material for the housing and support bar. In recent years, in order to reduce the weights of stabilizer links, for example, aluminum is used as a material of the housing and support bar as proposed in, for example, Patent Documents 3 and 4, and resin is used as a material for the housing and support bar as proposed in, for example, Patent Document 5.

For example, in the techniques of Patent Documents 3 and 4, first, a ball seat made of resin is formed at a ball portion of a stud ball by injection molding. Thus, a subassembly having the ball portion and the ball seat is obtained. Next, the subassembly is inserted into a die as a core, melted aluminum alloy is injected into the die, and die casting is performed. A housing and a support bar, which are integrally formed, are obtained by this insert molding using the subassembly as a core. Next, after a stud portion is connected to the ball portion of the subassembly, a dust cover is mounted to the subassembly, so that a stabilizer link is obtained.

For example, in the technique of Patent Document 5, a housing and a support bar, which are made of resin, are integrally formed, and the housing and the support bar, which are integrally formed, are used for the production of the above stabilizer link 200. The housing and the support bar are used as the housing 302 and the support bar 500, which are integrally formed as shown in FIG. 3C, and the housing and the support bar are mounted to the ball seat 301. The process shown in FIG. 3D is performed, so that a stabilizer link is obtained.

Patent Document 1 is Japanese Unexamined Patent Application Publication No. Hei 6-117429, Patent Document 2 is Japanese Unexamined Patent Application Publication No. Hei 7-54835, Patent Document 3 is Japanese Unexamined Patent Application Publication No. 2004-316771, Patent Document 4 is Japanese Unexamined Patent Application Publication No. 2005-265134, and Patent Document 5 is Japanese Unexamined Patent Application Publication No. 2009-257507.

SUMMARY OF THE INVENTION

Problems Solved by the Invention

However, in the techniques of Patent Documents 3 and 4 using aluminum, the melting point of aluminum is about 660 degrees C. Due to this, when a subassembly has an outer peripheral portion formed by the ball seat in the insert molding, it is necessary that a heat-resistant material (PEEK (polyether ether ketone) or the like) be used as a material of the ball seat. This material is expensive, and therefore production cost increases.

When the insert molding of Patent Documents 3 and 4 is used for the production for the stabilizer link 200 in which the fixing portion 412 of the dust cover 400 is held between flange portions 321 and 311, the dust cover 400 is made of resin (rubber or the like), so that there may be serious deterioration due to heat. Due to this, mounting of the dust cover cannot be performed in the insert molding, it is necessary that mounting of the dust cover be performed in another process after the insert molding, and fixing of fixing portion of the dust cover by holding cannot be performed. Due to this, other parts (circlip or the like) are necessary, and production cost further increases.

In the technique of Patent Document 5 using resin, the above problems of Patent Documents 3 and 4 using aluminum do not occur. However, the technique of Patent Document 5 can reduce the weight of a stabilizer link compared to the techniques of Patent Documents 3 and 4, but the technique of Patent Document 5 uses the same production method as that of the techniques of Patent Documents 1 and 2, so that the technique of Patent Document 5 cannot meet the need of production cost reduction in the field of stabilizer links in recent years.

The applicant has proposed a production method for stabilizer links in which insert molding, in which a resin is injected as a material for housing, is performed (for example, see Japanese Patent Application 2010-12380). In the production method, a subassembly having a stud ball, a ball seat, and a dust cover is inserted into a die as a core, and a cavity is formed. A resin is injected into the cavity, and injection molding is performed.

Specifically, the forming die used for an insert molding has a die body in which the subassembly is inserted as a core, and a die member having a radial direction surface pressing portion extending toward a radial direction inside. In the inserting of the subassembly into the die body, a predetermined gap is provided between an inner surface of the die body and an outer peripheral portion of the ball seat, an outer peripheral side radial direction surface of a fixing portion of the dust cover is pressed toward a flange portion of the ball seat by the radial direction surface pressing portion of the die member, and the fixing portion of the dust cover is held by the radial direction surface pressing portion of the die member and the flange portion of the ball seat. In this case, the pressing by the radial direction surface pressing portion of the die member is appropriately performed to withstand an injection molding pressure of the resin injection, and therefore, sealing characteristics between the dust cover and the die member and between the dust cover and the ball seat can be improved. As a result, leakage of resin to the outside can be prevented in insert molding.

However, in the production method proposed by the present applicant, a jig for attaching the die member to the subassembly has a complex structure, since the radial direction surface pressing portion of the die member constitutes a part of the cavity, using another die member in addition to the die body in the forming die. In addition, in order to effectively prevent leakage of the resin to the outside, improvement in the sealing characteristics is required, and a more desirable production method for stabilizer links is required.

Therefore, an object of the present invention is to provide a stabilizer link and a production method therefore in which a jig for attaching a forming die to a subassembly has a simple structure and which can effectively prevent leakage of resin to the outside.

The production method for stabilizer links of the present invention includes a preparing step in which a stud ball, a ball seat having a flange portion extending to a radial direction outside, and a dust cover having a fixing portion are prepared, a subassembly forming step in which a subassembly having the stud ball, the ball seat, and the dust cover is formed, a fixing step in which the ball seat of the subassembly is inserted into a hole of a ring member and the ring member is fixed to an outer peripheral portion of the ball seat, and an injection molding step in which the subassembly is inserted into a forming die as a core, a cavity is formed, and injection molding is performed by injecting a resin into the cavity, so that a housing covering an outer peripheral portion of the ball seat and a support bar supporting the housing are integrally formed, wherein in the subassembly forming step, an inner peripheral side radial direction surface of the fixing portion of the dust cover is abutted to an outer peripheral side radial direction surface of the flange portion of the ball seat, in the fixing step of the ring member, an outer peripheral portion of the ball seat and an inner peripheral portion of the ring member are abutted, an outer peripheral side radial direction surface of the fixing portion of the dust cover is pressed toward the flange portion of the ball seat by a surface of the ring member, and the fixing portion of the dust cover is held by the radial direction surface pressing portion of the die and the flange portion of the ball seat, and in the inserting of the subassembly into the forming die, a predetermined gap is provided between an inner surface of the forming die and the outer peripheral portion of the ball seat, an end portion of the forming die is abutted to another surface of the ring member, and the cavity is formed by an inner surface of the forming die, the outer peripheral surface of the ball seat, and the other surface of the ring member.

In the production method for stabilizer links according to the present invention, the subassembly having the stud ball, the ball seat, and the dust cover is formed, the ring member is fixed to the outer peripheral portion of the ball seat, the subassembly in which the ring member is fixed is inserted into the die as the core, the cavity is formed, and injection molding is performed by injecting the resin into the cavity.

In such insert molding, for example, the outer peripheral side radial direction surface of the fixing portion of the dust cover can be horizontally arranged by corresponding to a shape of the surface of the ring member, and as a result, the horizontal state of the surface of the ring member and the outer peripheral side radial direction surface of the fixing portion can be maintained. As described above, the ring member can be prevented from inclining, opposite surfaces of the surface of the ring member and the outer peripheral side radial direction surface of the fixing portion can be adhered, and opposite surfaces of an outer peripheral portion of the ball seat and an inner peripheral portion of the ring member can be adhered. In addition, the horizontal state of a surface of the ring member can be maintained, and as a result, opposite surfaces of an end portion of the forming die and another surface of the ring member can be adhered.

As described above, in the embodiment, sealing between the ball seat and the ring member, sealing between the ring member and the dust cover, and sealing between the forming die and the ring member, can be reliably improved by using the ring member. Thus, leakage of resin to the outside can be effectively prevented in insert molding. In addition, the attitude of the subassembly in injection molding can be stabilized by a simple method in which a simple structural member such as the ring member is used instead of the die member having a radial direction surface die, the ball seat of the subassembly is inserted into the hole of the ring member, and the end portion of the forming die is abutted to the other surface of the ring member. Furthermore, the ring member can be used as a component of the stabilizer link. Thus, a jig for attaching a forming die to the subassembly has a simple structure since it is not necessary to use a die member having a radial direction surface pressing die. In this case, since it is not necessary to contrive a shape of the fixing portion of the dust cover for improving the sealing in comparison with the case in which a die member having a radial direction surface pressing die is used, the stabilizer link can be applied to current mass-produced goods.

In the production method for stabilizer links of the present invention, various alternative examples may be used in order to improve various characteristics. For example, in forming of the cavity, a pressing member may be abutted to an outer peripheral side of a surface of the ring member. In this aspect, the ring member can be pressed against an injection pressure in the forming die by the pressing member in insert molding, and as a result, fixation of the ring member to the ball seat can be further stabilized. In addition, in forming of the cavity, the pressing member may have a surface that faces to the collar portion of the stud ball, so that the surface of the pressing member is abutted to the collar portion of the stud ball. In this aspect, the subassembly can be prevented from moving due to an injection pressure, and a neutral position of the stud portion in the stabilizer link can be ensured.

For example, the ring member may have a body in a plane ring shape having a surface, and a cylindrical portion extending from an inner peripheral side of another surface of the main body toward an axial direction and having a smaller outer diameter than that of the main body. In a pull-out test of the stud ball, there is a concern that force which expands the overhang portion of the ball seat is generated. However, the housing that covers the periphery of the ball seat has a function that suppresses the expansion of the overhang portion. In the case in which a length in an axial direction length of the main body of the ring member is extended, there is a concern that the above suppressing function cannot act by going down an upper surface position of the housing (in particular, by going down lower than the center of a ball portion of the stud ball). However, in the above aspect, a length in an axial direction length of the ring member can be extended by providing a cylindrical portion having a smaller outer diameter than that of the main body, and therefore, the fixation of the ring member to the ball seat is further stabilized. Moreover, the housing can cover the outer peripheral portion of the cylindrical portion, and as a result, the upper surface position of the housing can be prevented from going down. Therefore, the above defects do not occur.

In addition, at least one of a convex portion for a housing and a concave portion for the housing may be formed at the outer peripheral portion of the cylindrical portion of the ring member. In the pull-out test of the stud ball, there is a concern that the ring member may be moved by linking an extension of the ball seat. However, in the above aspect, at least one of the convex portion and the concave portion at the outer peripheral portion of the cylindrical portion of the ring member can be engaged with an opposite portion of the housing which faces thereto. Therefore, the above defects do not occur since the housing and the ring member are mechanically integrated.

At least one of a groove for a ring member and a projection portion for the ring member that fixes the ring member may be formed at the outer peripheral portion of the ball seat. In this case, the inner peripheral portion of the ring member engages with the groove for the ring member, and the ring member is held by the projection portion for the ring member and the fixing portion of the dust cover. In this aspect, fixation of the ring member to the ball seat can be further stabilized. In addition, as a material of the ring member, engineering thermoplastics including glass fiber can be used. In this aspect, strength of the ring member is improved and the ring member is reduced in weight. Furthermore, a C chamfering or an R chamfering can be carried out at an inner peripheral side corner portion of a surface of the ring member. In this aspect, press-fitting the ball seat to the hole of the ring member can be smoothly carried out.

In the case in which the ring member has only a main body, an axial direction length of the ring member can be set to 2 mm or more. Additionally, in the case in which the ring member has a main body and a cylindrical portion, an axial direction length of the ring member can be set to 2 mm or more. Furthermore, a fitting margin of the inner peripheral portion of the ring member relative to the outer peripheral portion of the ball seat can be set to within a range of 0.02 to 0.2 mm in diameter. In addition, press margin of the fixing portion of the dust cover which is pressed by a surface of the ring member can be set to within a range of 5 to 30% of a thickness of the fixing portion. An outer diameter of the ring member can be set to be not less than a total of an outer diameter of the flange portion of the ball seat and a thickness two times that of the dust cover. A press margin of the die body for the ring member can be set to be 1 mm or more in radius. A C chamfering or an R chamfering can be carried out at an inner peripheral side corner portion of a surface of the ring member.

A stabilizer link of the present invention is produced by the production method for stabilizer links according to the aspect of the present invention, and it has a stud ball, a ball seat, a dust cover, a ring member, a housing, and a support bar. The stabilizer link of the present invention can obtain the same effect as those of the production method for stabilizer links according to the aspect of the present invention, and a portion in which the dust cover is not held can be supported by the surface of the ring member, even if the portion is deformed in swing action of the stud ball. Therefore, the above deformed portion of the dust cover can be prevented from causing friction due to contact with an edge of the end portion of the housing. In addition, a stud removal load can be improved since the ring member has a function that suppresses expansion of the overhang portion. Furthermore, the fixing portion of the dust cover is held by the ring member and the flange portion of the ball seat, and as a result, a removal load against the dust cover can be improved.

According to the stabilizer link or the production method therefore of the present invention, a jig for attaching a forming die to a subassembly has a simple structure, leakage of the resin to the outside can be effectively prevented in the insert molding, and other effects can be obtained.

BRIEF DESCRIPTION OF DRAWINGS

FIGS. 16A and 16B are diagrams showing a structure of a specific example of a housing and a support bar, which are obtained by insert molding, of a stabilizer link according to an embodiment of the present invention.

EXPLANATION OF REFERENCE NUMERALS

Reference numeral 60 denotes a forming die, 61 denotes a die body, 61A denotes an end portion, 62 denotes a pressing portion, 62A denotes an end portion, 62B denotes a hole, 62C denotes an opposite surface, 70 denotes a cavity, 100 denotes a stabilizer link, 101 denotes a stud ball, 110 denotes a ball portion, 120 denotes a ball seat, 121 denotes a flange portion, 121B denotes an outer peripheral side radial direction surface, 122 denotes an outer peripheral side surface, 125 denotes a groove portion for ring member, 126 denotes a projection portion for ring member, 130 denotes a housing, 140 denotes a support bar, 150 denotes a ring member, 150A denotes a hole, 150B denotes one surface, 150C denotes another surface, 151 denotes a body, 151A denotes a hole, 152 denotes a cylinder portion, 153 denotes a projected band portion for housing (a convex portion for housing), 154 denotes a projection portion for housing (a convex portion for housing), 401 denotes a dust cover, 412 denotes a fixing portion, 412A denotes an inner peripheral side radial direction surface, and 412B denotes an outer peripheral side radial direction surface.

DESCRIPTION OF THE PREFERRED EMBODIMENTS

1. Respective Production Processes

Figure 6:
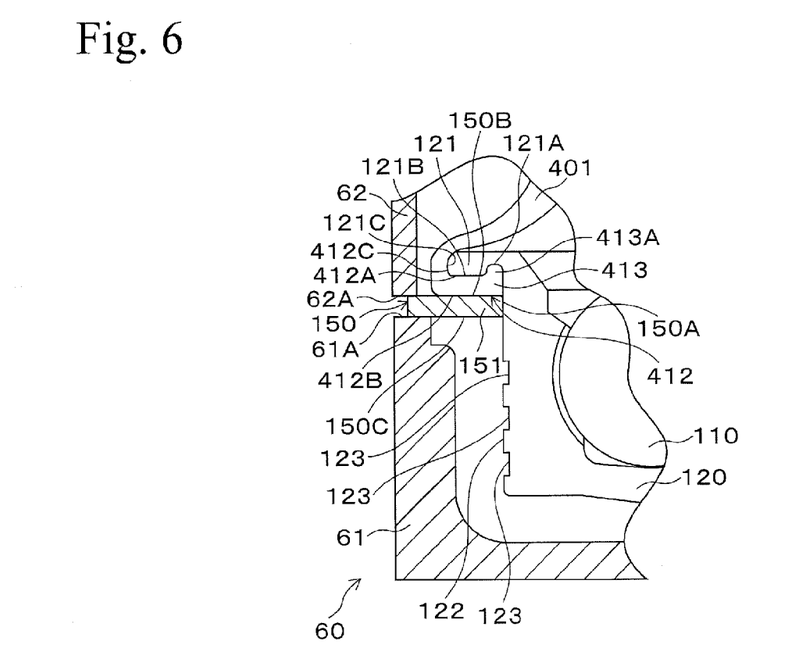
FIG. 6 is an enlarged side cross sectional diagram showing an insert molding condition of a production method for stabilizer links according to an embodiment of the present invention and showing a portion including a ring member.
Figure 12:
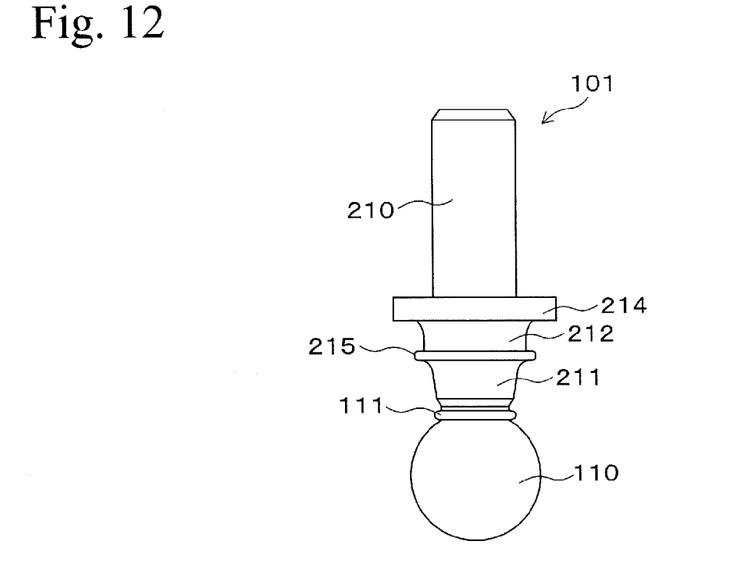
FIG. 12 is a schematic side view showing a structure of a stud ball of a stabilizer link of an embodiment according to the present invention.
Figure 13:
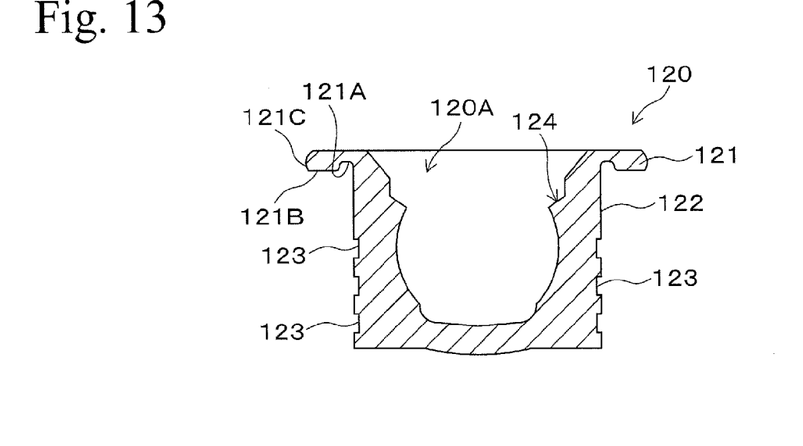
FIG. 13 is a schematic side cross sectional view showing a structure of a ball seat of a stabilizer link according to an embodiment of the present invention.

An embodiment of the present invention will be explained hereinafter with reference to the Figures. FIGS. 4A to 4D are side cross sectional diagrams of a portion of a structure showing each process of a production method for stabilizer link 100 according to an embodiment of the present invention. FIG. 6 is an enlarged side cross sectional diagram showing a portion including a ring member 150 in an insert molding illustrated in FIG. 4C. A vertical direction in FIG. 6 is opposite to that in FIG. 4C. FIG. 12 is a schematic side view showing a structure of a stud ball 101 used in the embodiment. FIG. 13 is a schematic side cross sectional view showing a structure of a ball seat 120 used in the embodiment.

A production method for stabilizer link 100 of the first embodiment is very different from the production method for stabilizer link 200 shown in FIGS. 3A to 3E in that a housing and a support bar are obtained by injection molding performed by insert molding using a resin. Thus, in the production method for a stabilizer link of the embodiment, a shape of a ball portion of a stud ball, a structure of a ball seat, a shape of a dust cover, and the like are modified. Thus, in the embodiment, the same reference numerals in FIGS. 1 to 3 are used for the same components in FIGS. 1 to 3, and explanations thereof will be omitted. In figures of the embodiment, a screw portion 213 of the stud ball 101 is not shown.

First, a stud ball 101, a ball seat 120, and a dust cover 401 are prepared.

In the stud ball 101, as shown in FIG. 12, for example, a steel ball which is approximately spherical is desirably used as the ball portion 110, and the ball portion 110 is desirably welded to a stud portion 210. In this feature, even when shrinkage deformation of the ball seat 120 occurs in the injection molding of housing 130, the action inhibition of the ball portion 110 can be prevented.

As shown in FIG. 13, the ball seat 120 has an opening portion 120A at one surface thereof. A flange portion 121, which extends from an outer peripheral side surface 122 of the ball seat 120 in a radial direction outside, is formed at the side surface 122. A groove portion 121A engaging with a projection portion 413A of a fixing portion 412 is desirably formed at a boundary portion between the flange portion 121 and the outer peripheral side surface 122 at the flange portion 121. The flange portion 121 has an outer peripheral side radial direction surface 121B (upper surface of the flange portion 121 in FIG. 6) to which an inner peripheral side radial direction surface 412A of the fixing portion 412 abuts and an axial direction surface 121C (outer peripheral side surface of the flange portion 121 in FIG. 6) to which an inner peripheral side axial direction surface 412C of the fixing portion 412 abuts.

A groove portion 123 having a recessed shape is desirably formed along a circumferential direction at the outer peripheral side surface 122 of the ball seat 120. In this case, in the stabilizer link 100, a projection portion 133 corresponding to the shape of the groove portion 123 of the ball seat 120 can be formed at an inner peripheral portion of housing 130, and the portions 123 and 133 can be fitted into each other. Therefore, sufficient strength against stud removal can be secured in the same manner as in the conventional thermal caulking portions. The groove portion 123 may be formed so as to have a shape divided in the circumferential direction of the outer peripheral side surface 122 of the ball seat 120, so that rotational action of the ball seat 120 relative to the housing 130 can be prevented. Instead of the groove portion 123, a projection portion or a tapered portion may be formed at the outer peripheral side surface 122. The projection portion may have a projection shape and may be formed along the circumferential direction. For example, the tapered portion may have an inclined shape of which a diameter is larger from the upper portion side to the bottom portion of the outer peripheral portion 122. An undercut portion having a recessed shape may be formed at the outer peripheral portion of the ball seat 120.

As shown in FIG. 12, a burr 111 may be formed at a weld portion of the stud ball 110. In this case, a pocket portion 124 having a recessed shape, in which the burr 111 of the weld portion as shown in FIG. 13 can be provided, is desirably formed at an inner peripheral portion of the ball seat 120 (for example, upper surface of an overhang portion) along the circumferential direction. In this feature, the inhibition of swing action of the stud ball 101, which may be caused by the burr 111 of the weld portion of the stud ball 101, can be prevented, so that the swing angle of the stud ball 101 can be sufficiently secured.

In the dust cover 401, a lip portion 411 is formed at one end portion, and the fixing portion 412 is formed at another end portion. A projection portion 413A is desirably formed at an inner peripheral surface of the end portion 413 of the fixing portion 412. The fixing portion 412 has an inner peripheral side radial direction surface 412A (upper surface of the fixing portion 412 in FIG. 6) of the fixing portion 412, denotes an outer peripheral side radial direction surface 412B (lower surface of the fixing portion 412 in FIG. 6) of the fixing portion 412, and an inner peripheral side axial direction surface 412C.

Figures 4A, 4B:
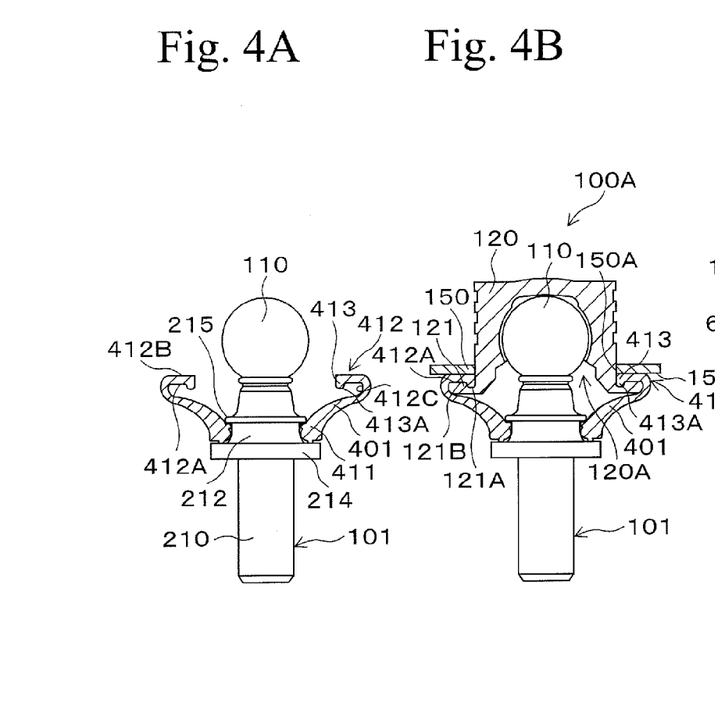
FIGS. 4A to 4D are side cross sectional diagrams of a portion of a structure showing each process of a production method for stabilizer links according to an embodiment of the present invention.

Next, for example, as shown in FIG. 4A, the lip portion 411 of the one end portion of the dust cover 401 is inserted and held between the collar portion 214 and the projection portion 215 so as to contact the straight portion 212 of the stud ball 101.

Then, for example, as shown in FIG. 4B, the ball portion 110 of the stud ball 101 is press-fitted into an opening portion 120A of the ball seat 120, and the inner peripheral side radial direction surface 412A of the fixing portion 412 of the another end portion of the dust cover 401 is abutted to the outer peripheral side radial direction surface (upper surface side in FIG. 4) of the flange portion 121 of the ball seat 120. The end portion 413 of the fixing portion 412 is abutted to the outer peripheral side surface 122 of the ball seat 120. In this case, the projection portion 413A of the fixing portion 412 is projected toward the groove portion 121A of the flange portion 121 so as to engage therewith. Thus, a subassembly 100A having the stud ball 101, the ball seat 120, and the dust cover 401 is obtained.

Figure 5A:
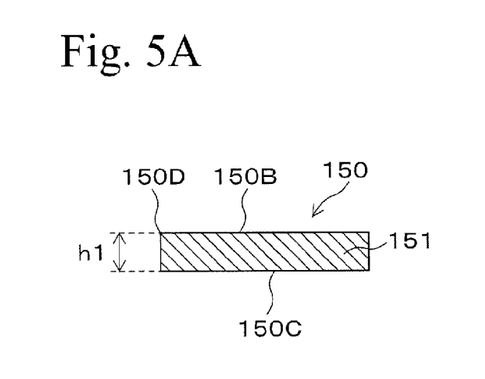
FIG. 5A is a side cross sectional diagram showing a right-half structure of a ring member used in a production method for stabilizer links according to an embodiment of the present invention.
Figure 5B:
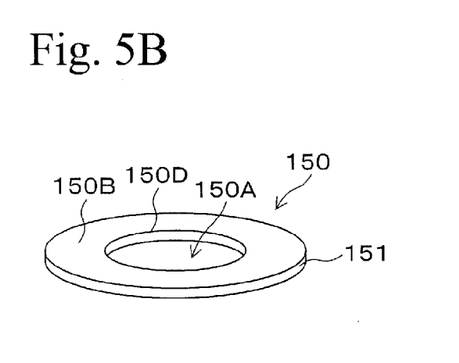
FIG. 5B is a perspective view thereof.

Next, a ring member 150 is prepared. For example, as shown in FIG. 5, the ring member 150 has a body 151 in a plane ring shape, and for example, a hole 150A in a circular shape is formed at the center of the body 151. As a material of the ring member 150, engineering thermoplastics including glass fiber is preferably used in order to attempt to improve strength and reduce in weight. As a material of the ring member 150, for example, the same resins as those of a housing 130 and a support bar 140 can be used, and in a case in which the predetermined strength is secured, for example, Nylon 66 including 30 wt % of fiberglass, Nylon 46 including 30 wt % of fiberglass, PPS (polyphenylene sulfide) including 30 wt % of fiberglass, or POM (polyacetal) including 30 wt % of fiberglass, is desirably used as the material. The included amount of the fiberglass may be set to be for example, 50%, and can be appropriately adjusted depending on required characteristics of the ring member 150. As a material of the ring member 150, metals such as iron, etc., can be used.

Then, the ring member 150 is fixed to the outer peripheral side surface 122 of the ball seat 120 by press-fitting the ball seat 120 of the subassembly 100A into the hole 150A of the ring member 150. In this case, as shown in FIG. 6, the outer peripheral side surface 122 of the ball seat 120 is abutted to an inner peripheral surface of the hole 150A of the ring member 150. In addition, the outer peripheral side radial direction surface 412B of the fixing portion 412 of the dust cover 401 is pressed to the flange portion 121 of the ball seat 120 by a surface 150B of the ring member 150, and the fixing portion 412 is held between the surface 150B and the flange portion 121. In this case, frictional force acts between the outer peripheral side surface 122 of the ball seat 120 and the inner peripheral surface of the ring member 150, and therefore, the position of the ring member 150 is maintained, even if repulsive force is generated by pressing the fixing portion 412 of the dust cover 401.

Figure 4C:
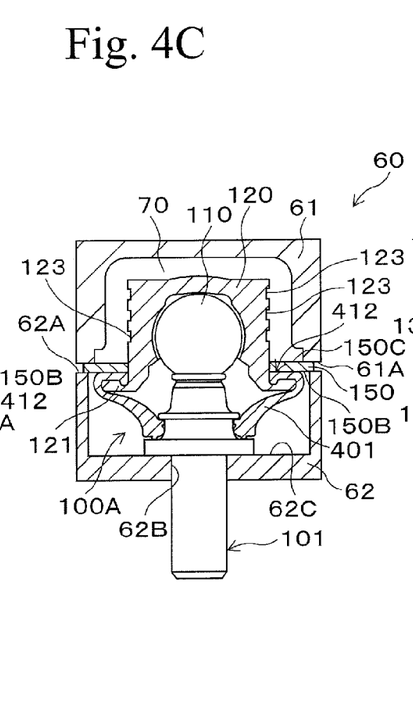

Next, for example, as shown in FIG. 4C, the subassembly 100A in which the ring member 150 is fixed is inserted as a core into a die body 61 of a forming die 60, a cavity 70 is formed, and a resin is injected in the cavity 70, and injection molding is thereby performed. In this insert molding, a housing and a support bar are integrally formed. FIG. 4C is a cross sectional diagram showing a cross sectional structure perpendicular to an axial direction of support bar and showing a structure including a housing forming die section. The die forming 60 has a configuration extending in a direction perpendicular to a surface of the sheet of FIG. 4C.

In the insert molding of the embodiment, a die having a die body 61 and a pressing member 62 is used as the forming die 60. In the inserting of the subassembly 100A into the die body 61, as shown in FIG. 6, a predetermined gap is provided between an inner surface of the die body 61 and the outer peripheral portion of the ball seat 120, and an end portion 61A of the die body 61 is abutted to an outer peripheral side of another surface 150C of the ring member 150.

It is preferable that an end portion 62A of the pressing member 62 be abutted to an outer peripheral side of a surface 150B of the ring member 150. The pressing member 62 has a hole 62B which passes through a stud portion 210 of the stud ball 101. The hole 62B is formed at an opposite surface 62C which faces to the collar portion 214 of the stud portion 210. In this case, an outer diameter of the ring member 150 is set to be not less than a total of an outer diameter of the flange portion 121 of the ball seat 120 and a thickness two times that of the dust cover 401, in order to abut by the pressing member 62. In addition, the outer diameter of the ring member 150 is set to be greater than an outer diameter of the end portion 131 of the housing 130 (FIG. 4D) to be formed. Furthermore, for example, it is preferable that a press margin of the die body 61 for the ring member 150 be set to be 1 mm or more in radius (that is, it is set to be not less than a value which adds 2 mm to an outer diameter of the end portion 131 of the housing 130).

Thus, the cavity 70 is formed by the inner surface of the die body 61, the outer peripheral portion of the ball seat 120, and the other surface 150C of the ring member 150. In this case, the cavity surface of the die body 61 has a shape corresponding to outer peripheral shapes of housing 130 and support bar 140.

Figure 16A:
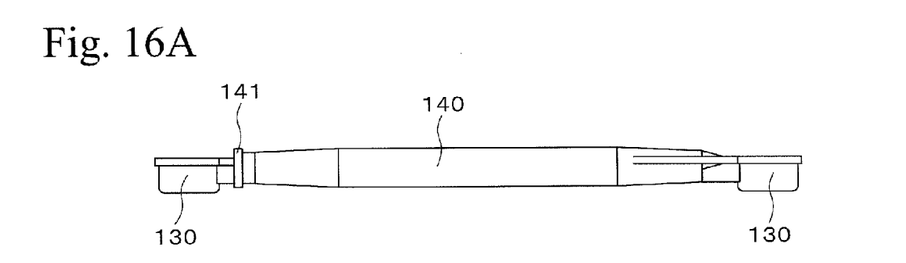
FIG. 16A shows a specific example in which a phase angle between housings is 0 degrees.
Figure 16B:
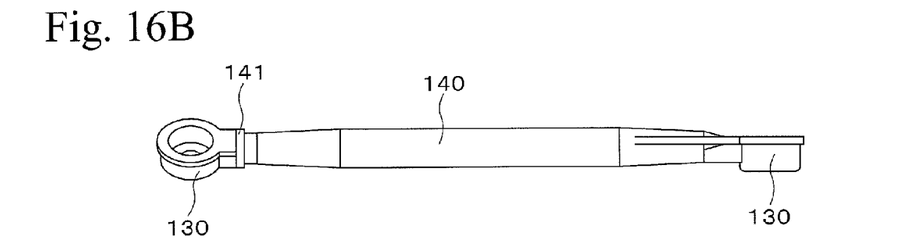
FIG. 16B shows a specific example in which a phase angle between housings is more than 0 degrees and less than 180 degrees.

FIGS. 16A and 16B are diagrams showing a structure of a specific example of a housing 130 and a support bar 140, which are obtained by insert molding, of a stabilizer link according to an embodiment of the present invention. FIG. 16A shows a specific example in which a phase angle between housings is 0 degrees, and FIG. 16B shows a specific example in which a phase angle between housings is more than 0 degrees and less than 180 degrees. For example, as shown in FIGS. 16A and 16B, when housings 130 are formed at both end portions of the support bar 140, a flange portion 501 for a divided die is desirably provided at a boundary portion between the housing 130, which is proximate to one end portion of the support bar 140, and the support bar 140. For example, the flange portion 141 for a divided die has a cross sectional shape which is an approximately the shape of a true circle.

When the housing 130 and the support bar 140 shown in FIG. 16B are formed, the forming die 60 has a support bar forming die section and housing forming die sections which are provided at both end portions of the support bar forming die section. In this case, it is desirable that the forming die 60 have a first divided die and a second divided die. The first divided die is used for forming the housing 130 proximate to one end portion of the support bar 140 (that is, the housing 130 having the flange portion 141 for divided die), and the second divided die is used for forming the support bar 140 and the housing 130 proximate to another end portion of the support bar 140. In this case, the forming die 60 may be a divided die structured such that a rotational angle of the first divided die relative to the second divided die can be adjusted at a predetermined angle. The rotational angle is set at a portion of the forming die 60 which corresponds to the flange portion 141 for a divided die. A typical cam member or the like can be used as a driving device for moving an upper die relatively to a lower die of the divided die having the first divided die and the second divided die.

In the above manner, since the forming die 60 is a divided die structured such that the rotational angle of the first divided die relative to the second divided die, which is set at the portion of the die 60 corresponding to the flange portion 141 for the divided die, can be adjusted, the phase angle between housings 130 can be set freely from 0 degrees to 180 degrees.

The resin used in the injection molding is a resin which is a material for the housing 130 and the support bar 140. In a case in which a predetermined strength of the housing and the support bar is secured, for example, Nylon 66 including 30 wt % of fiberglass, Nylon 46 including 30 wt % of fiberglass, or PPS (polyphenylene sulfide) including 30 wt % of fiberglass is desirably used as the material. In this case, the included amount of the fiberglass can be appropriately adjusted depending on required characteristics of the housing 130 and the support bar 140.

Figure 4D:
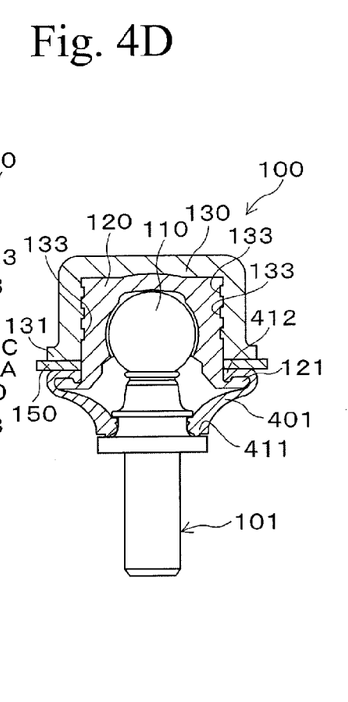
Figure 7:
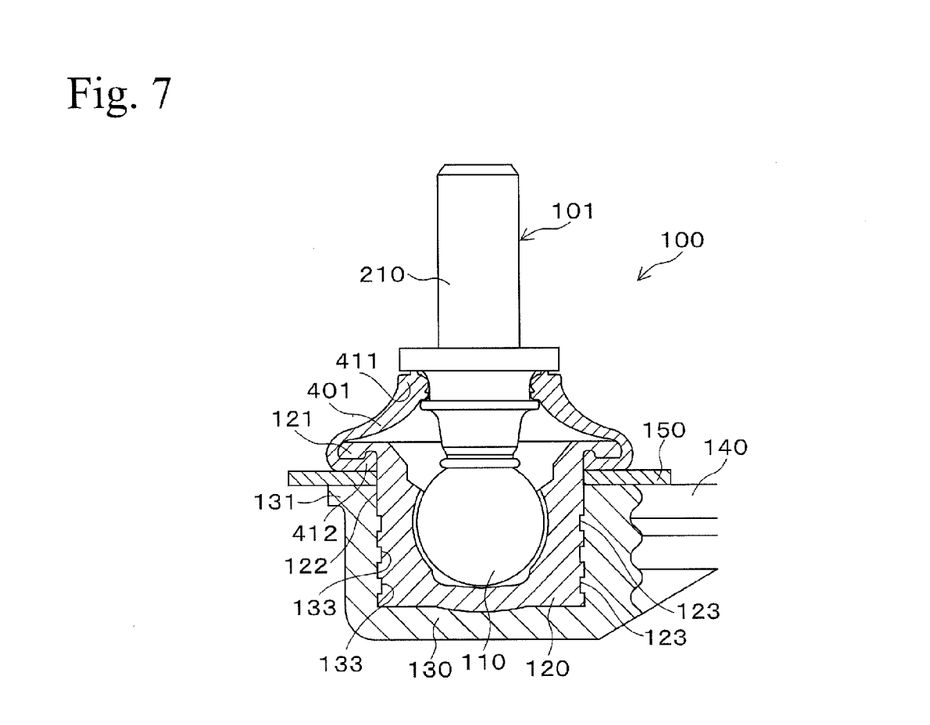
FIG. 7 is an enlarged side cross sectional diagram showing a portion of a stabilizer link produced by a production method for stabilizer links according to an embodiment of the present invention.

The resin is filled in the cavity 70 by this insert molding, so that, as shown in FIGS. 4D and 7, the housing 130 and the support bar 140 are integrally formed, so that a stabilizer link 100 is obtained. The housing 130 covers an outer peripheral portion of the ball seat 120, and the support bar 140 supports the housing 130. The stabilizer link 100 has a structure in which the fixing portion 412 of the dust cover 401 is held by the end portion 131 of the housing 130 and the flange portion 121 of the ball seat 120.

2. Advantages of Insert Molding of Resin

In the stabilizer link, in general, specified values of swinging torque, rotational torque, and elastic lift are set, and in general, these specified values are often required to be set at lower values. The torque and the elastic lift are opposite to each other, and these specified values depend on interference of housing and ball seat or interference of ball seat or stud ball. Therefore, in order to meet required characteristics of a vehicle, it is important that the interference be set at an optimum value based on input load and durability requirements.

In contrast, in the embodiment, when a melting point of the resin which is the material of the ball seat 120 is lower than those of the housing 130 and the support bar 140, in the injection molding by the insert molding, shrinkage deformation of the ball seat 120 may occur by heat and pressure. In this case, relationships between conditions of injection molding (temperature and pressure of resin injected in the injection molding, injection time period, and the like) and shrinkage deformation amount of the ball seat 120 are obtained in advance. In inserting of the ball portion 110 of the stud ball 101 into the ball seat 120, for example, at least one of the ball seat 120, which has an inner diameter set at a predetermined value, and the ball portion 110, which has an outer diameter set at a predetermined value, is used, so that clearance between the ball portion 110 and the ball seat 120 can be set at a predetermined value. The injection conditions of the insert molding are appropriately controlled, and the injection molding is performed, so that interference of the ball seat 120 can be set at an optimum value after the injection molding.

The resin injected in the injection molding by the insert molding has a melting point lower than that of aluminum, and the temperature of injection molding can be set to be equal to or lower than 300 degrees C. Thus, heat deterioration of the ball seat 120 can be prevented by appropriately setting the molding time period. Therefore, in this case, polyacetal, which is inexpensive, can be used as the material of the ball seat 120 in a manner different from the case of using aluminum as the injection molding material. In a case in which the dust cover 401 made of rubber is mounted and the subassembly 100A to which the ring member 150 is fixed is used as a core in forming of the subassembly 100A, the injection molding temperature can be set to be lower as described above, and in a manner different from the case of using aluminum as the injection molding material, heat deterioration of the dust cover 401 can be prevented even when the resin directly contacts the dust cover 401 made of rubber.

As described above, the subassembly 100A to which the ring member 150 is fixed is inserted as a core into the forming die 60, the cavity 70 is formed, and the insert molding in which the resin is injected in the cavity 70 is performed. Thus, the conventional process (shown in FIG. 3D), in which the ball seat 120 is subjected to thermal caulking, is unnecessary. In this manner, the number of production processes can be reduced, so that production cost can be reduced.

The interference of the ball seat 120 can be set at optimum value after the injection molding by the insert molding. As a result, swinging torque, rotational torque, and elastic lift, which are specified values of a stabilizer link, can be set at desired values, and characteristics required by a vehicle can be satisfied. The structure, in which the fixing portion 412 of the dust cover 401 is held by the end portion 131 of the housing 130 and the flange portion 121 of the ball seat 120, can be used, so that another process, in which the dust cover 401 is separately provided after the insert molding, is unnecessary, and other parts (circlip or the like), which was used in the conventional method using aluminum, is unnecessary. As a result, the production cost can be further reduced.

Since the insert molding using the subassembly 100A as a core is performed, the resin is filled in the cavity 70, and the housing 130 made of resin tightly adheres to the outer peripheral portion of the ball seat 120 and the other surface 150C of the ring member 150. Thus, the interference of the housing 130 relative to the ball seat 120 can be set at a desired value, so that torque characteristics and elastic lift can be at desired values. Therefore, there is no influence by evenness of size of a counter member, so that dimensional control is unnecessary.

3. Sealing Characteristics of Each Portion in Insert Molding

In the above insert molding, as shown in FIG. 6, using the subassembly 100A to which the ring member 150 is fixed as a core, the cavity 70 is formed by the inner surface of the die body 61, the outer peripheral portion of the ball seat 120, and the other surface 150C of the ring member.

At the portion between the ball seat 120 and the ring member 150, the outer peripheral side surface 122 of the ball seat 120 is abutted to the inner surface of the hole 150A of the ring member 150, as shown in FIG. 6. Thus, sealing can be performed between the ball seat 120 and the ring member 150. In this case, the outer peripheral side radial direction surface 412B of the fixing portion 412 of the dust cover 401 is pressed toward the flange portion 121 of the ball seat 120 by the surface 150B of the ring member 150, and the fixing portion 412 of the dust cover 401 is held by the surface 150B and the flange portion 121. Thus, sealing can be performed between the ring member 150 and the dust cover 401.

In this case, the projection portion 413A of the end portion 413 is projected toward the groove portion 121A of the flange portion 121 so as to engage therewith. Thus, sealing can be efficiently performed between the ring member 150 and the dust cover 401.

In addition, at a portion between the die body 61 and the ring member 150, the end portion 61A of the die body 61 is abutted to the outer peripheral side of the other surface 150C of the ring member 150. Thus, sealing can be performed between the die body 61 and the ring member 150.

Here, for example, the outer peripheral side radial direction surface 412B of the fixing portion 412 of the dust cover 401 can be horizontally arranged by corresponding to a shape of the surface 150B of the ring member 150, and as a result, the horizontal state of the surface 150B of the ring member 150 and the outer peripheral side radial direction surface 412B of the fixing portion 412 can be maintained. As described above, the ring member 150 can be prevented from inclining, opposite surfaces of the surface 150B of the ring member 150 and the outer peripheral side radial direction surface 412B of the fixing portion 412 can be adhered, and opposite surfaces of the outer peripheral side surface 122 of the ball seat 120 and the inner surface of the hole 150A of the ring member can be adhered. In addition, the horizontal state of the surface 150B of the ring member 150 can be maintained, and as a result, opposite surfaces of the end portion 61A of the die body 61 and the outer peripheral side of the other surface 150C of the ring member 150 can be adhered.

As described above, in the embodiment, sealing between the ball seat 120 and the ring member 150, sealing between the ring member 150 and the dust cover 401, and sealing between the die body 61 and the ring member 150, can be reliably improved by using the ring member 150. Thus, leakage of resin to the outside can be effectively prevented in insert molding. In addition, the attitude of the subassembly 100A in injection molding can be stabilized by a simple method in which a simple structural member such as the ring member 150 is used, the ball seat 120 of the subassembly 100A is inserted into the hole 150A of the ring member 150, and the end portion 61A of the die body 61 is abutted to the other surface 150C of the ring member 150. Furthermore, the ring member 150 can be used as a component of the stabilizer link 100. Thus, a jig for attaching a forming die 60 to the subassembly 100A has a simple structure since it is not necessary to use a die member having a radial direction surface pressing die. In this case, since it is not necessary to contrive a shape of the fixing portion 412 of the dust cover 401 for improving the sealing in comparison with the case in which a die member having a radial direction surface pressing die is used, the stabilizer link 100 can be applied to current mass-produced goods.

In the stabilizer link 100, a portion in which the dust cover 401 is not held can be supported by the surface 150B of the ring member 150, even if the portion is deformed in swing action of the stud ball 101. Therefore, the above deformed portion of the dust cover 401 can be prevented from causing friction due to contact with an edge of the end portion 131 of the housing 130. In addition, a stud removal load can be improved since the ring member 150 has a function that suppresses expansion of the overhang portion of the ball seat 120. Furthermore, the fixing portion 412 of the dust cover 401 is held by the ring member 150 and the flange portion 121 of the ball seat 120, and as a result, a removal load against the dust cover 401 can be improved.

In particular, in the case in which the pressing member 62 is abutted to the outer peripheral side of the surface 150B of the ring member 150 in forming of the cavity 70, the ring member 150 can be pressed against an injection pressure in the die body 61 by the pressing member 62 in insert molding, and fixation of the ring member 150 to the ball seat 120 can be further stabilized. The above effect can be effectively obtained by setting a press margin of the die body 61 for the ring member 150 to 1 mm or more in radius.

In this case, by abutting a surface 62C of the pressing member 62 which faces to the collar portion 214 of the stud portion 210 to the collar portion 214, the subassembly 100A can be prevented from moving due to an injection pressure, and a neutral position of the stud portion 210 in the stabilizer link 100 can be ensured. The above effect can be effectively obtained by setting a clearance between the collar portion 214 of the stud portion 210 and the surface 62C which faces to the pressing member 62 to 0.2 mm or less.

Furthermore, in the above embodiment, various characteristics can be improved when the following alternative examples are used.

For example, when the ring member 150 shown in FIG. 5 is used, it is preferable that an axial direction length h1 of a main body 151 be set to be 2 mm or more, in order to further stabilize the fixation of the ring member 150 to the ball seat 120. In this case, it is preferable that the upper limit of the axial direction length h1 be set to be for example, 5 mm.

Figure 8A:
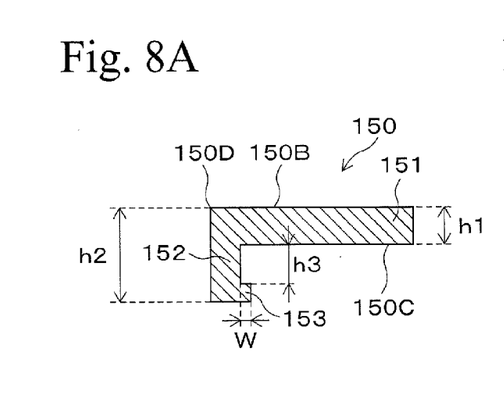
FIG. 8A is a side cross sectional diagram showing a right-half structure of a ring member used in an alternative production method for stabilizer links according to an embodiment of the present invention.
Figure 8B:
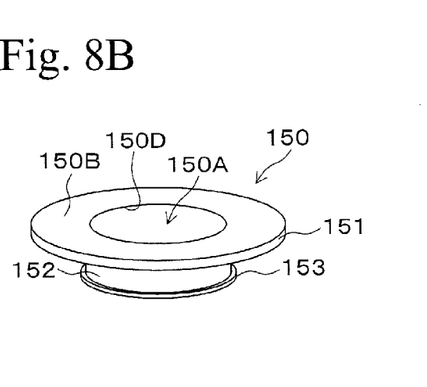
FIG. 8B is a perspective view thereof.
Figure 9:
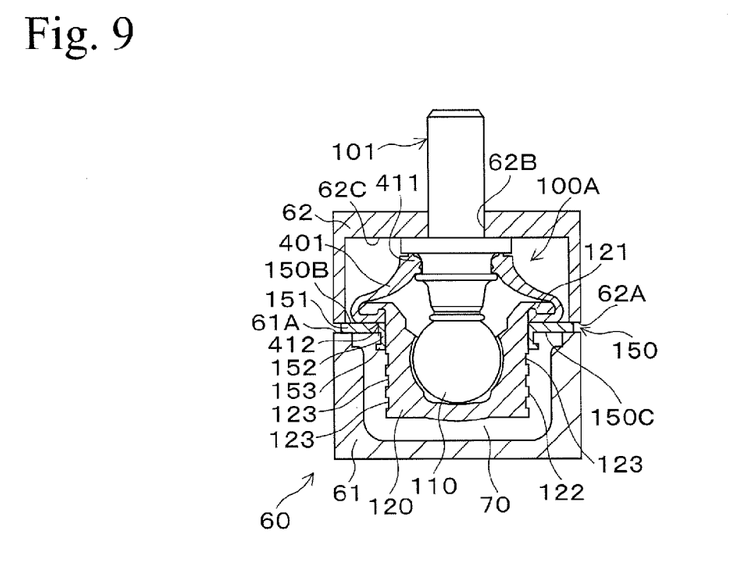
FIG. 9 is a side cross sectional diagram of a portion of a structure showing an insert molding condition of an alternative production method for stabilizer links according to an embodiment of the present invention.
Figure 10:
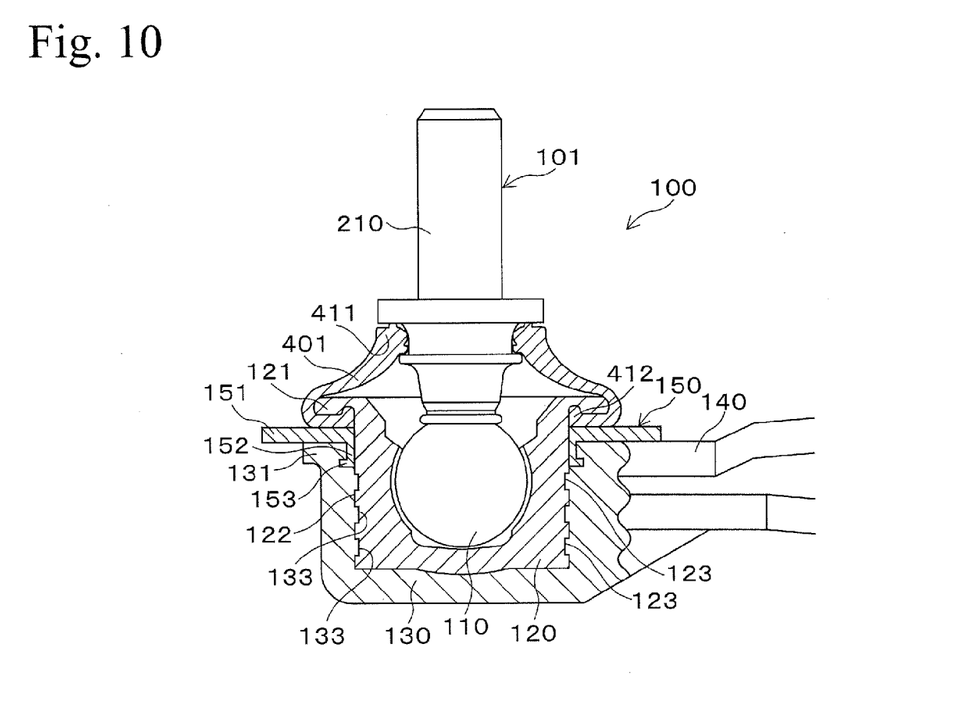
FIG. 10 is an enlarged side cross sectional diagram showing a portion of a stabilizer link produced by an alternative production method for stabilizer links according to an embodiment of the present invention.

The ring member 150 may have a cylindrical portion 152, for example, as shown in FIG. 8. The cylindrical portion 152 extends from the inner peripheral side of the other surface 151C of the main body 151 toward an axial direction, and has a smaller outer diameter than that of the main body 151. In this aspect, the axial direction length of the ring member 150 can be set to be long by providing the cylindrical portion 152 having a smaller outer diameter than that of the main body 151, and the fixation of the ring member 150 to the ball seat 120 can be stabilized in injection molding shown in FIG. 9. In this case, since the housing 130 can cover the outer periphery of the cylindrical portion 152, in the stabilizer link 100, an upper surface position of the housing 130 does not lower, for example, as shown in FIG. 10. In this manner, the housing 130 which covers the periphery of the ball seat 120 in a pull-out test of the stud ball 101 can reliably demonstrate a function which suppresses the expansion of the overhang portion.

Figure 11:
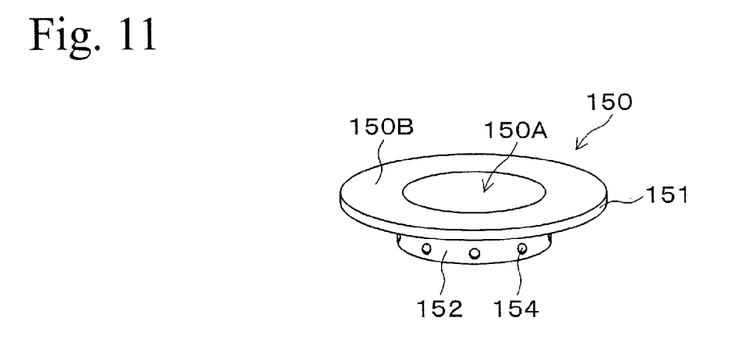
FIG. 11 is an enlarged side cross sectional diagram showing a portion of a stabilizer link produced by another alternative production method for stabilizer links according to an embodiment of the present invention.

In addition, for example, as shown in FIG. 8, the outer peripheral portion of the cylindrical portion 152 can have a projected band portion for the housing 153 which extends along a circumferential direction, as a convex portion for housing. In this aspect, the projected band portion 153 of the cylindrical portion 152 and an opposite portion of the housing 130 which faces thereto can be engaged with each other. Therefore, the moving of the ring member 150, which is linked to an extension of the ball seat 120 in the pull-out test of the stud ball 101, can be prevented, since the housing 130 and the ring member 150 are mechanically integrated. In addition, plural projection portions for housing 154 may be formed at the outer peripheral portion of the cylindrical portion 152 along a circumferential direction, as a convex portion for the housing, for example, as shown in FIG. 11. It is suitable that the height of the projection portion for housing 154 be set to 0.1 to 0.5 mm. Furthermore, a belt-shaped groove for a housing may be formed as a concave portion for housing instead of the projected band portion for the housing 153, and plural holes for housing which separate each other may be formed as a concave portion for housing instead of the projection portion for housing 154. Additionally, the convex portion for housing and the concave portion for housing may be used in combination as necessary.

In the case in which the cylindrical portion 152 is provided, in order to effectively obtain the above effect, it is preferable that an axial direction length h2 of the ring member 150 be set to 2 mm or more, for example, as shown in FIG. 8. In this case, for example, it is preferable that the upper limit of the axial direction length h2 be set to 5.5 mm. In addition, it is preferable that an axial direction length h3 between the other surface 150C of the main body 151 and a surface of the projection portion 153 that faces each other be set to within a range of 0.2 to 1.0 mm. Furthermore, it is preferable that a projection height w of the projection portion 153 be set to within a range of 0.2 to 1.0 mm. It is preferable that the axial direction length h1 of the main body 151 be set to for example, 1 to 5 mm.

Figure 14:
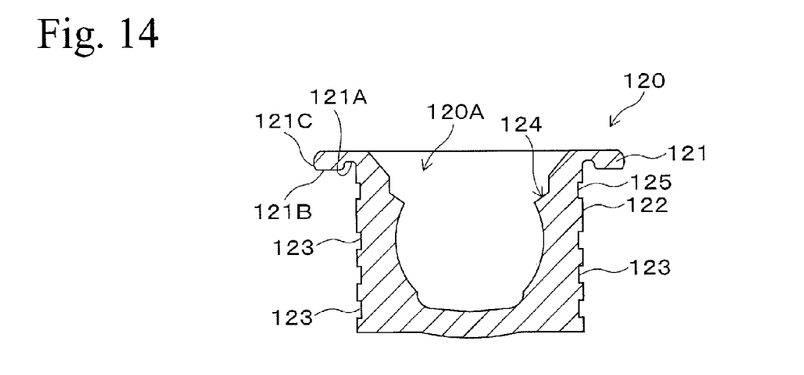
FIG. 14 is a schematic side cross sectional view showing a structure of an alternative ball seat of a stabilizer link according to an embodiment of the present invention.
Figure 15:
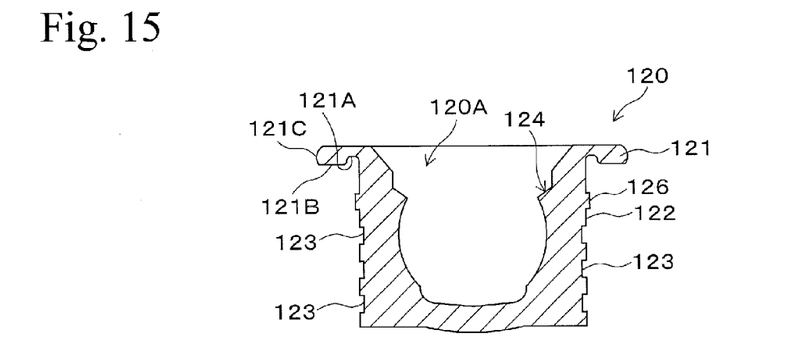
FIG. 15 is a schematic side cross sectional view showing a structure of another alternative ball seat of a stabilizer link according to an embodiment of the present invention.

The outer peripheral side surface 122 of the ball seat 120 may have a groove for ring member 125 for fixing the ring member 150, for example, as shown in FIG. 14. The inner peripheral portion of the ring member 150 engages with the groove for ring member 125. The outer peripheral side surface 122 of the ball seat 120 may have the projection portion for ring member 126, for example, as shown in FIG. 15. The ring member 150 is held by the projection portion for ring member 126 and the fixing portion 412 of the dust cover 401. In the above aspect, the fixation of the ring member 150 to the ball seat 120 can be further stabilized.

It is preferable that a C chamfering or an R chamfering be carried out at an inner peripheral side corner portion 154D of the surface 150B of the ring member 50. In this aspect, press-fitting the ball seat 120 to the hole 150A of the ring member 150 can be smoothly carried out. It is preferable that a fitting margin of the inner peripheral surface of the hole 150A of the ring member 150 relative to the outer peripheral side surface 122 of the ball seat 120 be set to within a range of 0.02 to 0.2 mm in diameter, in order to effectively improve the sealing between the ring member 150 and the ball seat 120. In addition, it is preferable that the press margin of the fixing portion 412 of the dust cover 401, which is pressed by the surface 150B of the ring member 150, be set to within a range of 5 to 30% of a thickness of the fixing portion 412, in order to effectively improve the sealing between the ring member 150 and the ball seat 120.

The invention claimed is:

1. A production method for stabilizer links, comprising:
a preparing step in which a stud ball, a ball seat having a flange portion extending to a radial direction outside, and a dust cover having a fixing portion are prepared,
a subassembly forming step in which a subassembly having the stud ball, the ball seat, and the dust cover is formed,
a fixing step in which the ball seat of the subassembly is inserted into a hole of a ring member and the ring member is fixed to an outer peripheral portion of the ball seat, and
an injection molding step in which the subassembly is inserted into a forming die as a core, a cavity is formed, and injection molding is performed by injecting a resin into the cavity, so that a housing covering an outer peripheral portion of the ball seat and a support bar supporting the housing are integrally formed,
wherein in the subassembly forming step, an inner peripheral side radial direction surface of the fixing portion of the dust cover is abutted to an outer peripheral side radial direction surface of the flange portion of the ball seat,
in the fixing step of the ring member, an outer peripheral portion of the ball seat and an inner peripheral portion of the ring member are abutted, an outer peripheral side radial direction surface of the fixing portion of the dust cover is pressed toward the flange portion of the ball seat by a surface of the ring member, and the fixing portion of the dust cover is held by the radial direction surface pressing portion of the die and the flange portion of the ball seat, and
in the inserting of the subassembly into the forming die, a predetermined gap is provided between an inner surface of the forming die and the outer peripheral portion of the ball seat, an end portion of the forming die is abutted to another surface of the ring member, and the cavity is formed by an inner surface of the forming die, the outer peripheral surface of the ball seat, and the other surface of the ring member.

2. The production method for stabilizer links according to claim 1, wherein in forming of the cavity, a pressing member is abutted to an outer peripheral side of a surface of the ring member.

3. The production method for stabilizer links according to claim 1, wherein in forming of the cavity, a pressing member has a surface which faces to a collar portion of the stud ball, so that the surface of the pressing member is abutted to the collar portion of the stud ball.

4. The production method for stabilizer links according to claim 1, wherein the ring member has a main body in a plane ring shape having a surface, and an axial direction length of the main body is set to 2 mm or more.

5. The production method for stabilizer links according to claim 1, wherein the ring member has a main body in a plane ring shape having a surface and a cylindrical portion extending from an inner peripheral side of another surface of the main body toward an axial direction and having a smaller outer diameter than that of the main body.

6. The production method for stabilizer links according to claim 5, wherein at least one of a convex portion for housing and a concave portion for housing is formed at an outer peripheral portion of the cylindrical portion of the ring member.

7. The production method for stabilizer links according to claim 5, wherein an axial direction length of the ring member is set to 2 mm or more.

8. The production method for stabilizer links according to claim 1, wherein at least one of a groove for a ring member and a projection portion for a ring member which fixes the ring member is formed at the outer peripheral portion of the ball seat, the inner peripheral portion of the ring member engages with the groove for ring member, and the ring member is held by the projection portion for ring member and the fixing portion of the dust cover.

9. The production method for stabilizer links according to claim 1, wherein a fitting margin of the inner peripheral portion of the ring member relative to the outer peripheral portion of the ball seat is set to within a range of 0.02 to 0.2 mm in diameter.

10. The production method for stabilizer links according to claim 1, wherein a press margin of the fixing portion of the dust cover which is pressed by a surface of the ring member is set to within a range of 5 to 30% of a thickness of the fixing portion.

11. The production method for stabilizer links according to claim 1, wherein an outer diameter of the ring member is set to be not less than a total of an outer diameter of the flange portion of the ball seat and a thickness two times that of the dust cover.

12. The production method for stabilizer links according to claim 1, wherein a press margin of the forming die for the ring member is set to be 1 mm or more in radius.

13. The production method for stabilizer links according to claim 1, wherein a C chamfering or an R chamfering is carried out at an inner peripheral side corner portion of a surface of the ring member.

14. The production method for stabilizer links according to claim 1, wherein engineering thermoplastics including glass fiber are used as a material of the ring member.

15. A stabilizer link produced by the production method for stabilizer links according to claim 1, comprising the stud ball, the ball seat, the dust cover, the ring member, the housing, and the support bar.

* * * * *